United States Patent [19]

Kubo et al.

[11] Patent Number: 4,970,387
[45] Date of Patent: Nov. 13, 1990

[54] POSITION TRANSDUCER HAVING ABSOLUTE POSITION COMPENSATION

[75] Inventors: Keishi Kubo, Moriguchi; Masaki Suzuki, Hirakata; Norio Okutani, Neyagawa, all of Japan

[73] Assignee: Matsushita Electric Industrial Co., Ltd., Kadoma, Japan

[21] Appl. No.: 290,489

[22] Filed: Dec. 27, 1988

[30] Foreign Application Priority Data

Dec. 28, 1987 [JP] Japan .................. 62-332046

[51] Int. Cl.⁵ .................. G01D 5/34; H03M 1/22
[52] U.S. Cl. .................. 250/231.14; 250/231.18; 341/3
[58] Field of Search ........ 250/231 SE, 237 G, 231.18, 250/231.16, 231.14; 356/374, 373, 394; 33/706, 707; 341/13, 9, 3

[56] References Cited

U.S. PATENT DOCUMENTS

| | | | |
|---|---|---|---|
| 4,384,204 | 5/1983 | Tamaki et al. | 250/237 G |
| 4,412,206 | 10/1983 | Schwefel | 250/231 SE |
| 4,439,672 | 3/1984 | Salaman | 250/231 SE |
| 4,524,347 | 6/1985 | Rogers | 341/3 |
| 4,572,952 | 2/1986 | March | 341/9 |
| 4,621,256 | 11/1986 | Rusk | 341/3 |
| 4,700,062 | 10/1987 | Ernst | 250/231 SE |
| 4,712,088 | 12/1987 | Ernst | 250/231 SE |
| 4,772,872 | 9/1988 | Villani | 250/231 SE |

Primary Examiner—David C. Nelms
Assistant Examiner—Michael Messinger
Attorney, Agent, or Firm—Cushman, Darby & Cushman

[57] ABSTRACT

A scale (110) having apertures representing a binary code (113A–113E) and other apertures (115, 116, 111) generating two compensation signals and moiré fringes in cooperation with a mask (105) having tilted apertures (112A) is scanned by a light beam (101A), and the light beam which has passed through the aperture is detected, and an approximate position of the scale is detected by means of the binary code, then a precise position is detected by a signal of the moiré fringes which is compensated on the basis of a predetermined algorithm (Table 1) specified by the compensation signals.

3 Claims, 12 Drawing Sheets

POSITION TRANSDUCER HAVING ABSOLUTE POSITION COMPENSATION

FIELD OF THE INVENTION AND RELATED ART STATEMENT

1. Field of the Invention

The present invention relates generally to a position transducer, and more particularly to an absolute position transducer for detecting an absolute position with a high accuracy.

2. Description of the Related Art

In position detecting devices using an optical mark reader having a plurality of apertures arranged by a specific rule, a light beam which has passed the aperture is converted into an electric signal by a photoelectric device, and a level of the electric signal is divided into a plurality of steps, and thereby high precision measurement of position is realized. In recent development, a plurality of signals which are different from each other in phase are detected with a plurality of detectors, and accuracy in measurement has been improved by processing the plural signals.

In conformity with development of an industrial robot, a higher accuracy in measurement of position is required, and a position transducer of an absolute type has been introduced to meet the requirement. An example of a prior art position transducer as shown in the Japanese published unexamined patent application Sho No. 59-211822 is illustrated in FIG. 11. In the prior art, light beams from a light source 3 are applied on a rotary disk 1 through a lens 12. The light beams which has passed a plurality of apertures 7 arranged in a predetermined binary code on the rotary disk 1 are detected by respective photoelectric devices 8, 9, 10 and 11 which are arranged to the respective apertures of a mask 2 having a plurality of apertures. A pitch of the apertures on the mask 2 is made to be to 5/4 of a pitch of the slit 7 on the rotary disk 1. Output signals from the respective photoelectric devices 8, 9, 10 and 11 are switched in turn by switches Sw$_1$, Sw$_2$, Sw$_3$ and Sw$_4$, and then, fundamental waves of the respective signals are selected by band-pass filter 6. Phases of the respective fundamental waves are compared with the phases of the outputs from the switches Sw$_1$, Sw$_2$, Sw$_3$ and Sw$_4$, and thereby an absolute position is detected.

In the above-mentioned detecting method, however, the detected signals are distorted, and a pure sine wave is obtainable. In order to improve the disadvantage, deforming the shape of the apertures has been tried, but the disadvantage cannot be completely improved. Furthermore, with respect to the power source, it is difficult to illuminate uniformly all apertures, and then it is not easy that sensitivity of each photoelectric device is equalized.

Additionally, since the output signal of the respective photoelectric devices are switched, switching noises are superimposed on the signals. Consequently, distortion in the output signal is inevitable due to the above-mentioned plural problems, and thus non-linear error is produced in position measurement.

On the other hand in the absolute position transducer using apertures of binary code, many bits are required to improve precision in measurement, and a lot of photoelectric devices must be arranged, accordingly. Consequently, the position transducer becomes large in size and is expensive in cost.

OBJECT AND SUMMARY OF THE INVENTION

An object of the present invention is to provide a position transducer having a higher precision and a less non-linear error than the conventional position transducer.

The position transducer in accordance with the present invention comprises:

a movable scale having first apertures representing a position thereof and second apertures arranged parallelly to each other with a predetermined pitch, a mask located adjacent to the scale and having third apertures corresponding to the first apertures and fourth apertures for generating moiré fringes in relation with the second apertures, a light source for generating a light beam, an optical means for deflecting said light beam in a manner to scan said first apertures and second apertures, a photoelectric sensor for detecting light beam which has passed through the first apertures and second apertures, and also third apertures and fourth apertures, and a signal processing circuit for processing output from the photoelectric sensor to produce position data.

DESCRIPTION OF THE PREFERRED EMBODIMENTS

[First Embodiment]

Figure 1:
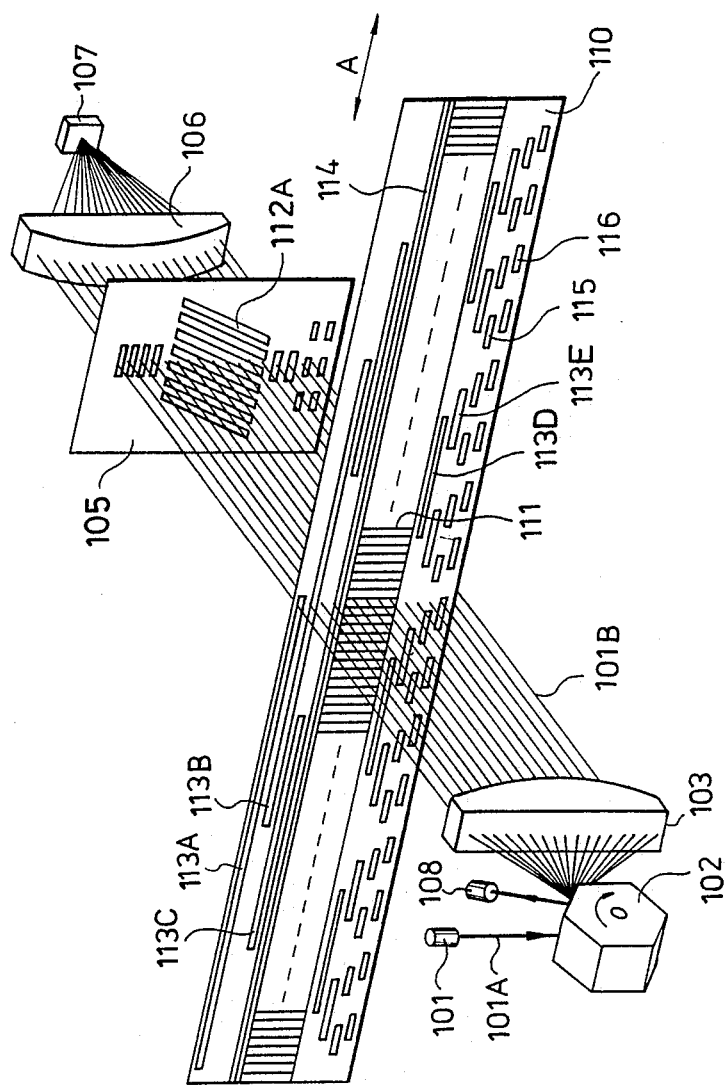
FIG. 1 is a perspective view of a first embodiment of a position transducer in accordance with the present invention.

FIG. 1 shows a configuration of a first embodiment of the position transducer in accordance with the present invention. Referring to FIG. 1, a light beam 101A emitted from a semiconductor laser device 101 is reflected by a polygon mirror 102 rotating in a direction shown by an arrow and is deflected in a predetermined plane. The deflected light beam is collimated by a lens 103. A movable scale 110 and an affixed mask 105 are disposed in the light path of the collimated light beam 101B. In FIG. 1, though the mask 105 is illustrated apart from the scale 110 so as to help understanding, in the actual position transducer the mask 105 is positioned closely adjacent to the scale 110.

The light beam which has passed the scale 110 and the mask 105 is concentrated on a photoelectric sensor 107 by a lens 106 and is detected. On the other hand, a photoelectric sensor 108 is faced to the polygon mirror 102 and detects a reflecting light of the light beam 101A, and thereby a synchronizing signal is generated.

The scale 110 has apertures 113A, 113B, 113C, 113D and 113E for together forming a 5-bits binary code, apertures 111 for moiré fringes, an aperture 115 for a first compensation signal and an aperture 116 for a second compensation signal, an aperture 114 for a synchronizing signal for detecting a signal by the moiré fringes. The apertures 111 are arranged in parallel with the scanning direction of the light beam 101B. The aperture 114 is a single slit positioned along the length of the scale 110. Gray code, or a kind of the binary code, is optimum to the embodiment.

Figure 2:
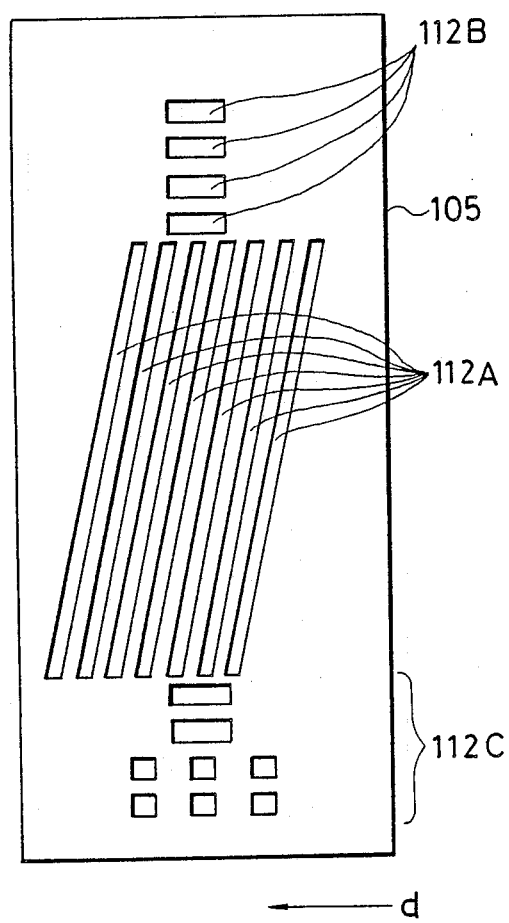
FIG. 2 is a front view of a mask of the first embodiment.
Figure 3A:
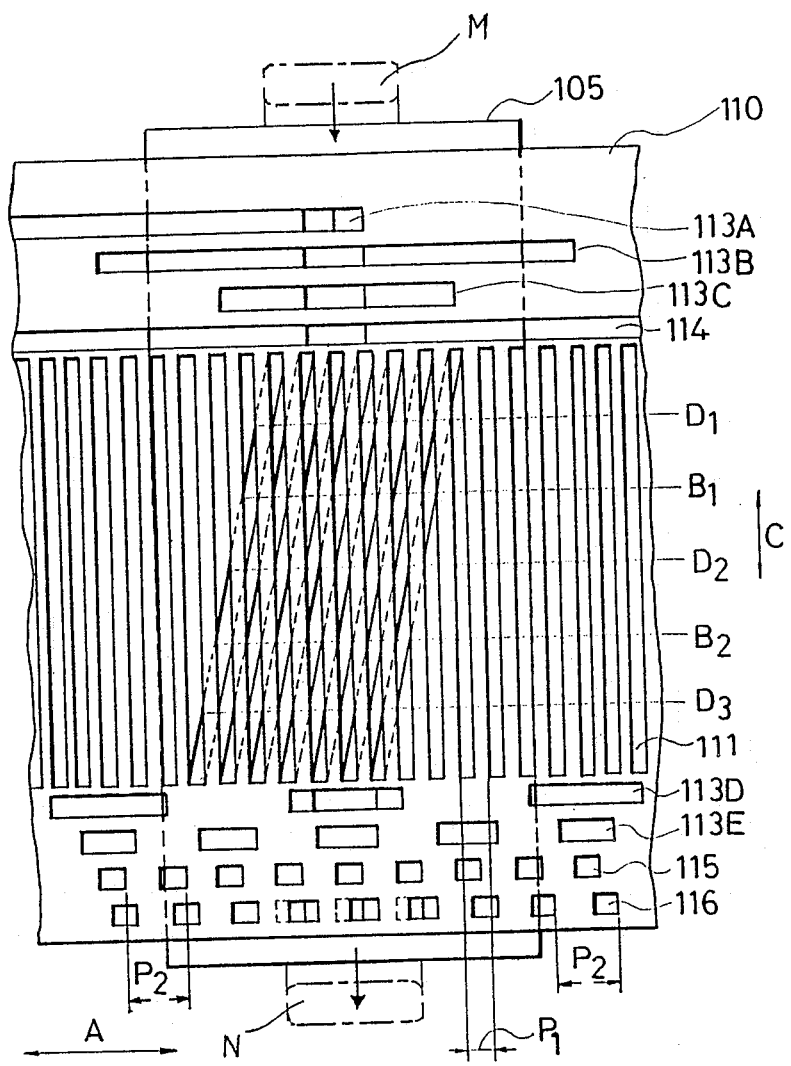
FIG. 3(a) and FIG. 3(b) are front views of a scale and the mask in operating state of the first embodiment.

FIG. 2 is a front view of the mask 105. The mask 105 has three groups of apertures 112A, 112B, 112C. The apertures 112A are identical with the aperture 111 of the scale 110 in its width and pitch, and are tilted relative to the aperture 111 so that a dislocation between an upper end and a lower end of the aperture 112A in a direction of an arrow "d" is equal to three times of pitch of the aperture 111 as shown in FIG. 3(a). In FIG. 2, the apertures 112B pass the light from the apertures 113A, 113B, 113C and 114. Moreover, the apertures 112C pass the light from the apertures 113D, 113E, 115 and 116.

FIG. 3(a) is a front view of the scale 110 and mask 105 in their operating state. Referring to FIG. 3(a), squares M and N show sections of the light beam 101B at the upper position and at the lower position of the scanning, respectively. The light beam 101 which travels perpendicular to the sheet of FIG. 3(a) scans vertically from the upper position M to the lower position N with a predetermined speed. The parallel lines in light beam 101B of FIG. 1 schematically show beam light axes at instants of every small time periods. Arrow A shows the moving direction of the scale 110. The aperture 115 is identical with the aperture 116 in its pitch and width, and location of the aperture 115 is phase-shifted by 90° with respect to the aperture 116. The pitch of the apertures 115 and 116 is equal to two times the pitch of the aperture 111, and is made to be equal to two times a minimum detectable length L of the binary code.

Operation of the position transducer of the first embodiment is elucidated hereafter. Referring to FIG. 1, the light beam 101A emitted from the semiconductor laser device 101 is deflected by the rotary polygon mirror 102. Subsequently, the light beam is collimated by the lens 103, and scans the scale 110 from the upper edge to the lower edge. The light beam which has passed the apertures of the scale 110 and the mask 105 is concentrated on the photoelectric sensor 107 by the lens 106 so as to be detected thereby. Thus, a signal of binary code is generated on the basis of the light beam which passed the apertures 113A, 113B, 113C, 113D and 113E. The signal of binary code is processed by a well-known circuit, and an absolute position of the scale 110 is detected with an accuracy corresponding to the pitch of the aperture of LSB (least significant bit) of the binary code. Additionally, as shown in FIG. 3(a), moiré fringes are formed by the apertures 111 of the scale 110 and the apertures 112A of the mask 105, and dark portions $D_1$, $D_2$ and $D_3$ and bright portions $B_1$ and $B_2$ are alternately generated. The moiré fringes move in the direction perpendicular to the moving direction of the scale 110, as shown by an arrow C.

Figure 3B:
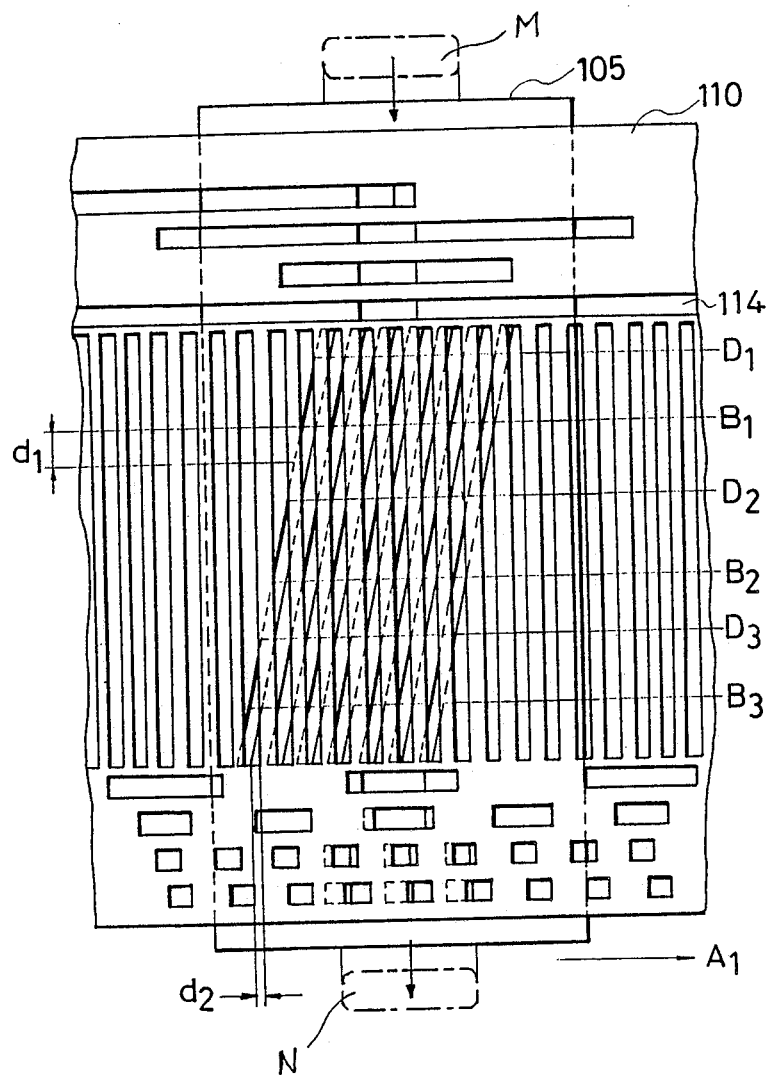

FIG. 3(b) is a front view of the scale 110 and the mask 105 wherein the scale 110 is shifted to a direction of an arrow $A_1$ by a distance $d_2$. The dark portions $D_1$, $D_2$ and $D_3$ and the bright portions $B_1$ and $B_2$ move upward by a distance $d_1$. The dark portions $D_1$, $D_2$ and $D_3$ and the bright portions $B_1$, $B_2$ and $B_3$ are detected by the photoelectric sensor 107 (FIG. 1) by scanning the moiré fringes with the light beam 101B.

Figures 4A, 4B:
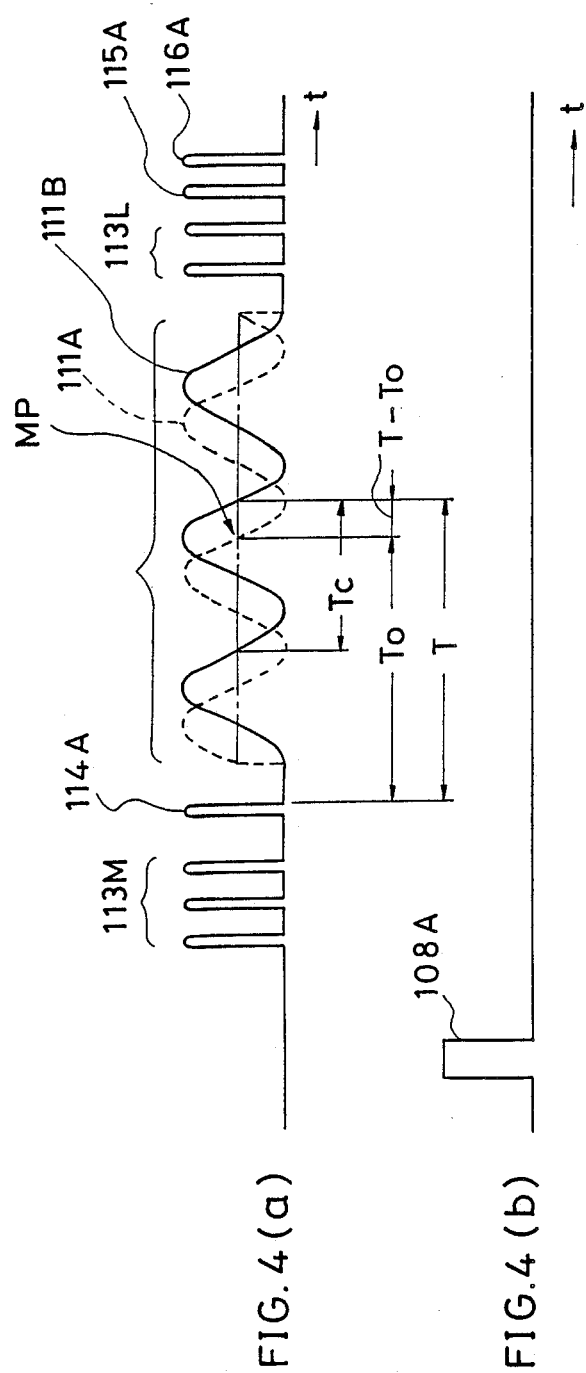
FIG. 4(a) and FIG. 4(b) are waveforms of output signals of photoelectric devices in the first embodiment.

FIG. 4(a) shows a waveform of an output signal of the photoelectric sensor 107, and FIG. 4(b) shows a waveform of an output signal of the photoelectric sensor 108. A signal 108A of the photoelectric sensor 108 is firstly output by scanning with the light beam 101A. Subsequently, the output signal of the photoelectric sensor 107 is output as shown in FIG. 4(a). Referring to FIG. 4(a), pulse-shaped signals 113M and 113L are of the apertures 113A, 113B, 113C, 113D and 113E of the binary code. A moiré synchronizing signal 114A and compensation signals 115A and 116A are generated by the apertures 114, 115 and 116, respectively. Signals 111A and 111B are generated by the moiré fringes. The signal 111A is an output signal by the moiré fringes which are present at a moiré reference position MP as described hereafter, and the signal 111B is a signal output by the moiré fringes moving from the reference position. In FIG. 4(a), a time "Tc" is a cyclic time of the moiré fringes, and a time "To" is a time period between the moiré synchronizing signal 114A and the moiré reference position MP. A time "T" is a time period between the moiré synchronizing signal 114A and an intersection of the output signal 111B and a base level of the moiré signal. The moiré reference position MP is a constant position determined by measurement after assembly of the position transducer.

Figure 5:
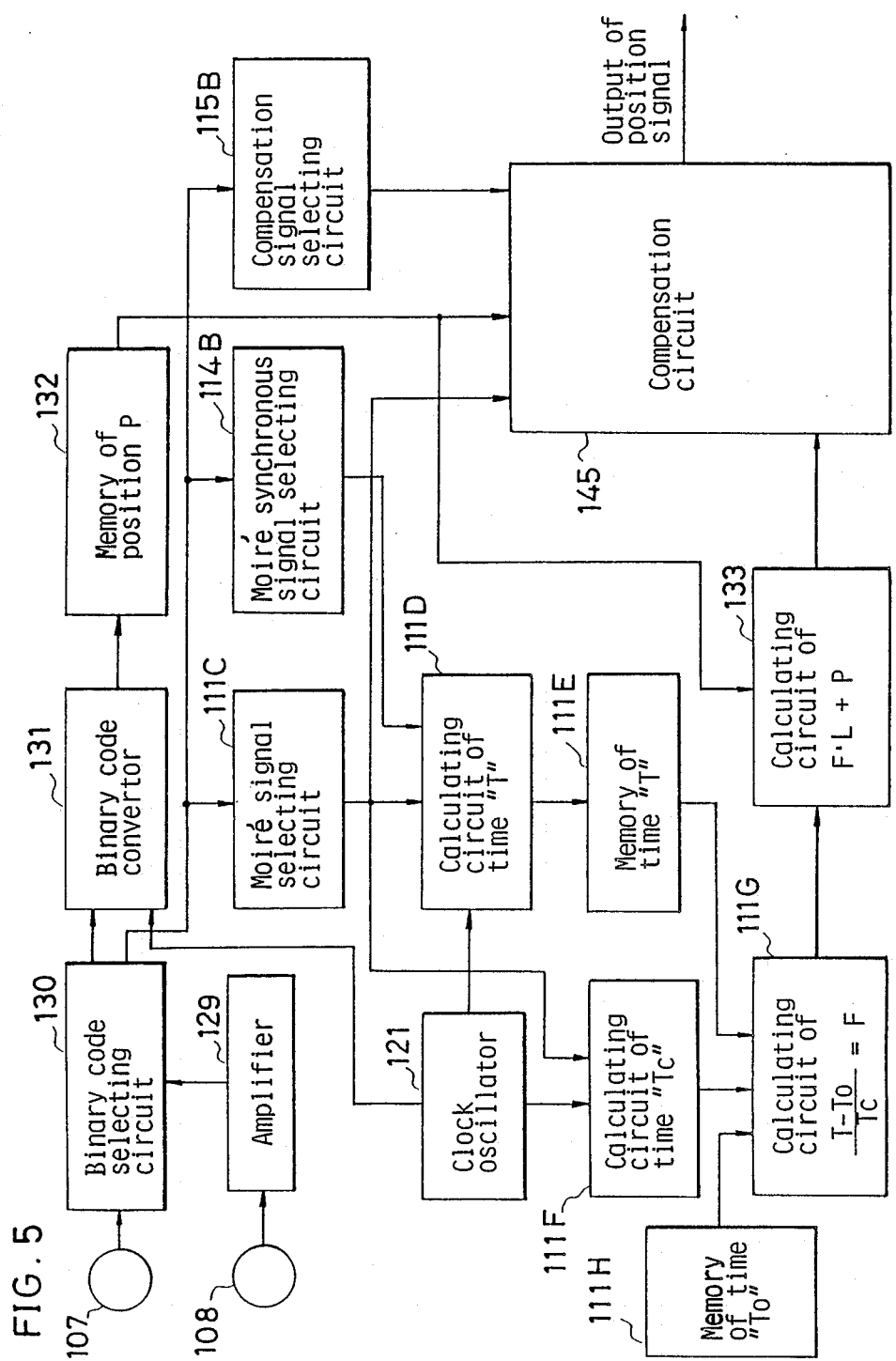
FIG. 5 is a block diagram of the circuit for detecting a position in the first embodiment.

FIG. 5 is circuitry of a signal processing circuit in the first embodiment. The output signals of the photoelectric sensors 107 and 108 are inputted into a binary code selecting circuit 130, and a binary code signal is selected. Then the binary code signal is inputted into binary code converter 131, in which the binary code is converted into a data of an absolute position of the scale 110, and the absolute position is memorized in a memory 132. On the other hand, the moiré signal 111B is selected by a moiré signal selecting circuit 111C, and is inputted into a calculates circuit 111D which calculating the time "T" and a calculating circuit 111F for calculating the time "Tc". Moreover, the moiré synchronizing signal 114A is selected by a moiré synchronizing signal selecting circuit 114B, and is inputted into the calculating circuit 111D. In the calculating circuits 111D and 111F, the times "T" and "Tc" are calculated on the basis of the clock signal from a clock oscillator 121. The data of the times "T" and "Tc" are inputted into the calculation circuit 111G with data of the time "To" measured in a memory 111H, and a value "F" is obtained by calculation of the following equation (1):

$$F=(T-To)/Tc \qquad (1).$$

The value "F" represents a ratio of a shift distance of the moiré fringes to one pitch of the moiré fringes; in other words, it represents a shift ratio of the moiré fringes which is detected by travel of the moiré fringes from the moiré reference position.

A product of the shift ratio and the minimum detectable length L is calculated by a calculation circuit 133. The value of the product represents an infinitesimal distance in the minimum detectable length L. Subsequently, the infinitesimal distance is added to the position detected by the binary code, and thereby, an accurate absolute position is detected.

In calculation of the equation (1), since a dimension of a time (T−To) is divided by a dimension of a time (Tc), the quotient representing the shift ratio is an absolute number. Therefore, the resultant infinitesimal distance is not influenced by fluctuation of the periodic time of the clock signal or the moiré fringes which is caused by dislocation in arrangement of the scale 110 and the mask 105.

Moreover, since the trigger signal 114A which is a reference signal in measurement of the time "T" and "To" is generated by the aperture 114 which is located adjacent to the apertures 111, the time "T" and "To" is not influenced by dislocation in assembly of the scale 110 or by fluctuation of the scanning speed of the light beam. Consequently, a higher accuracy in measurement of the infinitesimal distance is realizable.

Figures 6A, 6B, 6C, 6D:
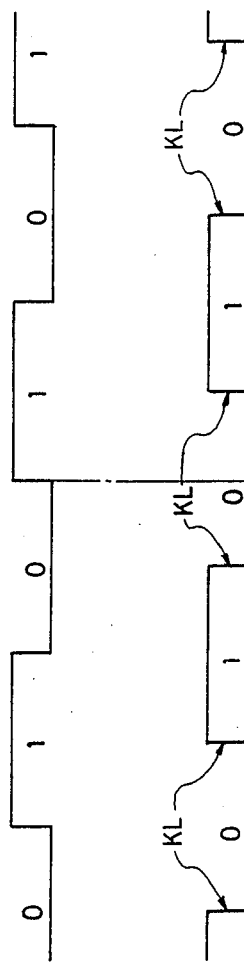
FIG. 6(a) is a waveform chart of a first compensation signal.
FIG. 6(b) is a waveform chart of a second compensation signal.
FIG. 6(c) is a scale showing measurement ranges of an absolute position by a binary code.
FIG. 6(d) is a scale showing measurement ranges by moiré fringes.

FIG. 6(a) shows a waveform of a first compensation signal, and FIG. 6(b) shows a waveform of a second compensation signal. FIG. 6(c) shows a scale showing measuring ranges of the absolute position by means of the binary code, and in the embodiment, the minimum detectable length L is 10 μm. The numerals on the scale, for example +10 μm, −20 μm or the like, represent a shift distance of the scale 110 from an initial position z. FIG. 6(d) shows a scale representing measuring ranges by means of the moiré fringes.

In case that respective edges KL of the signal in FIG. 6(b) coincide with boundaries KM of the measuring range of distance by moiré fringes as shown in FIG. 6(c), an accurate absolute position is obtainable by adding a distance by moiré fringes to an absolute distance detected by the binary code.

In the actual position transducer, however, since a diameter the light beam 101B is larger than two times of the pitch $P_2$ of the aperture 115, an output signal of the photoelectric sensor 107 is a triangular wave. Then, a duty ratio of the first compensation signal is varied by variation of condition of the circuit for reforming the waveform of the triangular wave, and thus, the edges KL cannot coincide with the responding boundaries KM as seen from FIG. 7(b) and FIG. 7(d).

In the following, the reason that the error is produced in the represented value is elucidated.

Figures 7A, 7B, 7C, 7D:
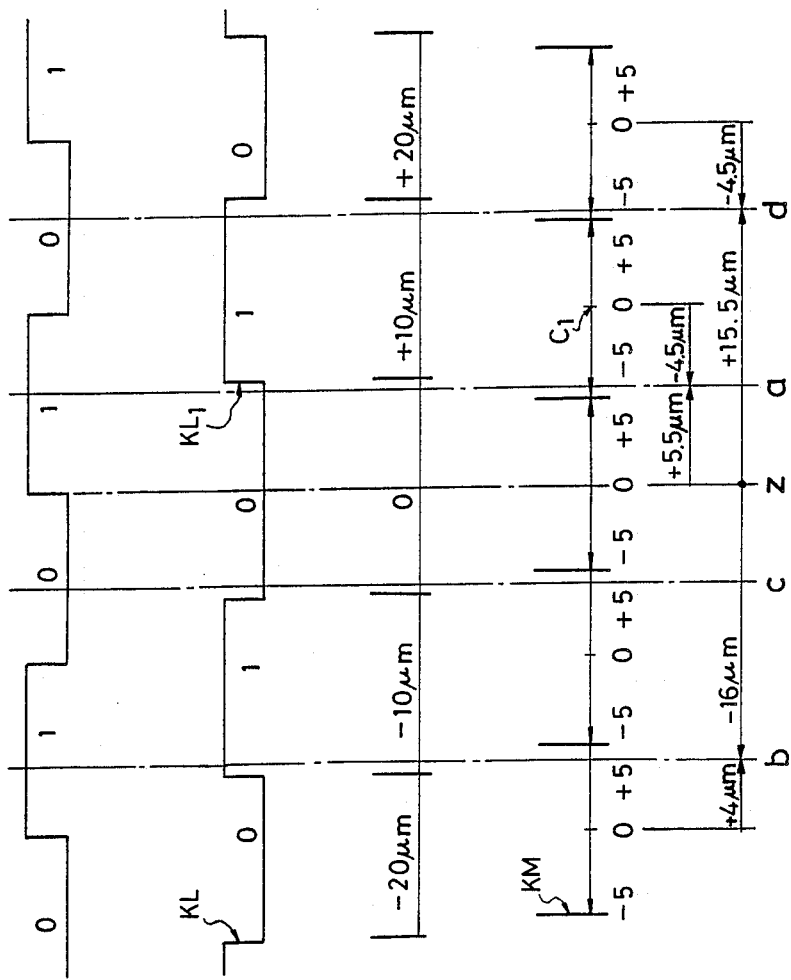
FIG. 7(a) is a waveform of a first compensation signal.
FIG. 7(b) is a waveform of a second compensation signal.
FIG. 7(c) is a diagram of a scale showing measurement ranges of an absolute position by the binary code.
FIG. 7(d) is a scale showing measurement ranges by the moiré fringes.

Referring to FIG. 7(c) and FIG. 7(d), in case that a position "a" is detected, for example, which is +5.5 μm in truth value from a position "z", a distance of −4.5 μm should be detected in the range of +10 μm of the scale of FIG. 7(c) as a measured value by moiré fringes. Thus, the distance between the positions "a" and "z" is expected to be +5.5 μm (given by +10 μm−4.5 μm=+5.5 μm). As a matter of fact, however, since an edge $KL_1$ of the signal of FIG. 7(b) is dislocated rightward, the range of zero μm is detected by binary code. Therefore, a totalized value of the absolute position detected by the binary code and the infinitesimal distance by the moiré fringes becomes −4.5 μm (given by 0 μm−4.5 μm=−4.5 μm). Consequently, an error of 10 μm is present.

In order to prevent the error as described above, in the present invention, in case that a measured value "F" by the moiré fringes is within the range defined by relation (2), a detected absolute position by the binary code is compensated as follows by using a signal of the first compensation aperture 115 as shown in FIG. 7(a) and a signal of the second compensation aperture 116 as shown in FIG. 7(b).

$$+2.5<F, F<-2.5 \qquad (2).$$

With respect to the position "a" in FIG. 7(d), for example, since the measured value "F" of moiré fringe is −4.5 μm, the absolute position of binary code is compensated in the following manner:

In case that the second compensation signal of FIG. 7(b) is "0" and the first compensation signal of FIG. 7(a) is "1", a value of 10 μm is added to a detected value of the absolute position. Consequently, the true absolute position is represented by calculation of the relation (3).

$$10\ \mu m+(-4.5\ \mu m)=+5.5\ \mu m \qquad (3).$$

The algorithm of the compensation is shown in Table 1.

TABLE 1

| Measured value F of moire fringe | Level of first compensation signal | Level of second compensation signal | Compensation or non-compensation |
| --- | --- | --- | --- |
| $F > +\frac{L}{4}$ (+2.5 μm) | 0 | 0 | −L (−10 μm) |
|  |  | 1 | non-compensation |
|  | 1 | 0 | non-compensation |
|  |  | 1 | −L (−10 μm) |
| $F < -\frac{L}{4}$ (−2.5 μm) | 0 | 0 | non-compensation |
|  |  | 1 | +L (+10 μm) |
|  | 1 | 0 | +L (+10 μm) |
|  |  | 1 | non-compensation |

With respect to the position "b" for example, compensation of the absolute position "b" is calculated in accordance with the Table 1 as described hereinafter: since the measured value "F" is larger than +2.5 μm (F>+2.5 μm), the first compensation signal is "1" and the second compensation signal is "1", then a true absolute position is obtained by subtracting 10 μm from the sum of an absolute position of binary code and a measured value of moiré fringes. The calculation is as follows:

$$(-10\ \mu m)+(4\ \mu m)-10\ \mu m=-16\ \mu m \qquad (4).$$

Consequently, the true absolute position of $-16$ $\mu$m can be detected.

Moreover, with respect to the position "d", since the measured value "F" of moiré fringes is smaller than $-2.5$ $\mu$m, the second compensation signal is "1" and the first compensation signal is "0", a value of 10 $\mu$m is added to the detected absolute value. Consequently, $$10 \ \mu m - 4.5 \ \mu m + 10 \ \mu m = +15.5 \ \mu m \qquad (5).$$

The above-mentioned calculations are accomplished in a compensation circuit 145 having a microprocessor and memories.

[Second Embodiment]

Figure 8:
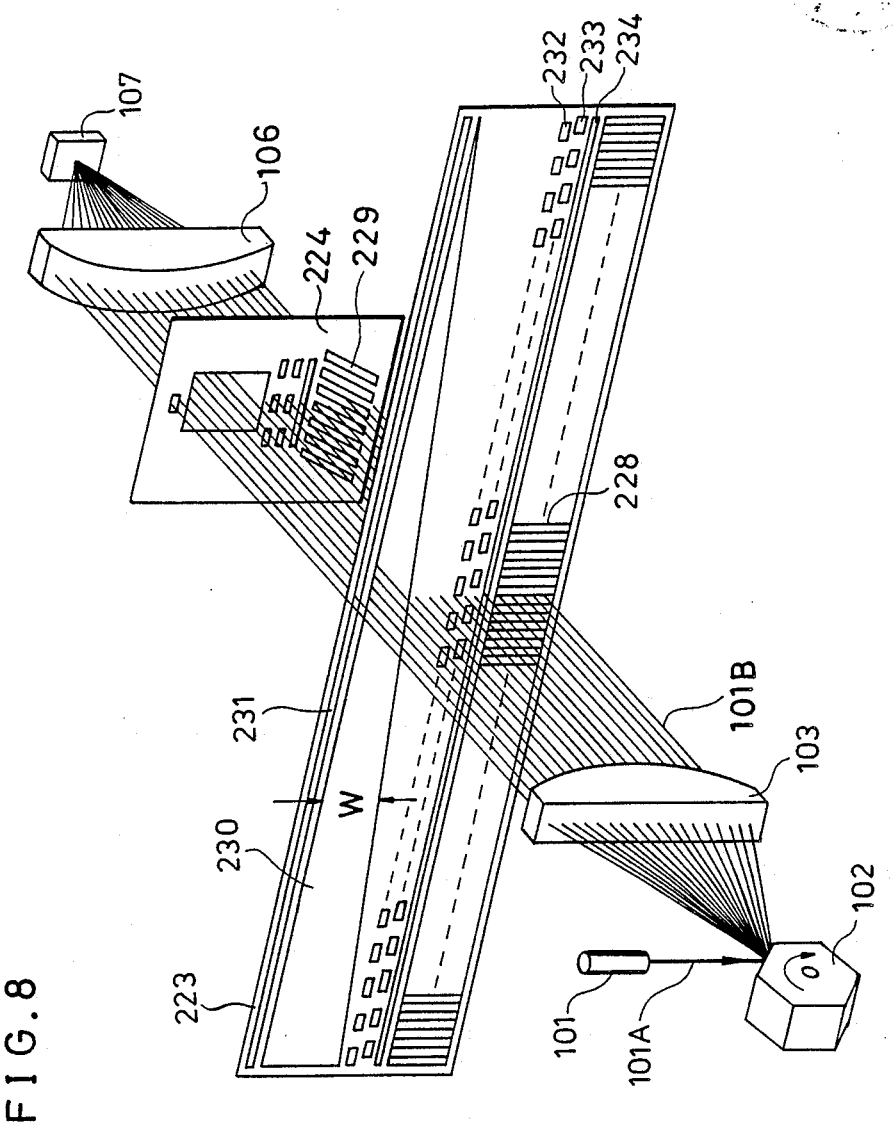
FIG. 8 is a perspective view of a second embodiment of the position transducer in accordance with the present invention.

FIG. 8 is a perspective view of a second embodiment of the position transducer in accordance with the present invention. Referring to FIG. 8, the optical system which is composed of the semiconductor laser device 101, the polygon mirror 102, the lenses 103 and 106 and the photoelectric sensor 107 is identical with that of the first embodiment. In the second embodiment, a trigger aperture 231 is located at the uppermost portion of a scale 223. A wedge-shaped aperture 230 is disposed under the trigger aperture 231 on the scale 223. Moreover, apertures 232 and 233 for compensation signals, a trigger aperture 234 for generating a trigger signal for the moiré fringes signal are provided under the wedge-shaped aperture 230 in the cited order. On the lowest portion of the scale 223, apertures 228 for producing the moiré fringes are also provided.

Figure 9:
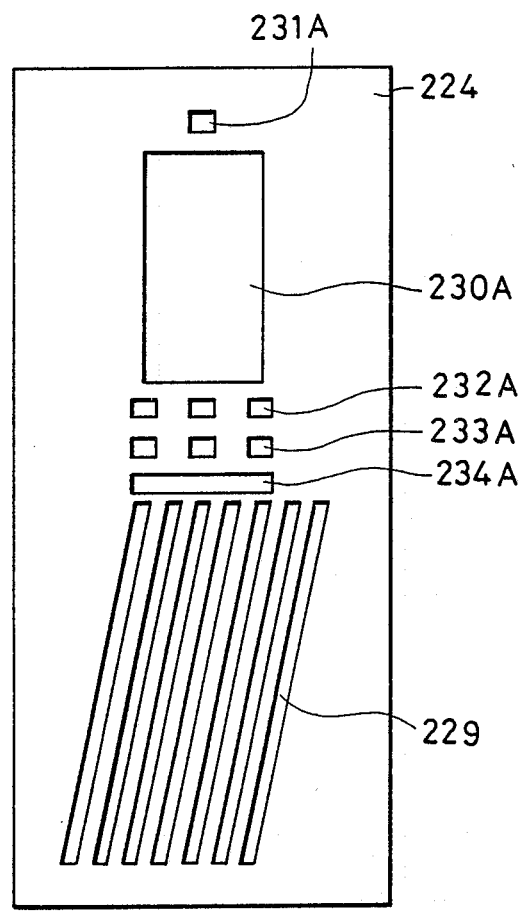
FIG. 9 is a front view of a mask in the second embodiment.

FIG. 9 is a front view of a mask 224. Referring to FIG. 9, the light beam 101B passes through the apertures 231A, 230A, 232A, 233A, 234A and 229 after passing through the apertures 231, 230, 232, 233, 234 and 228, respectively. In the second embodiment, an absolute position of the scale 223 corresponds to a width W of the wedge-shaped aperture 230, and the absolute position is detected by measuring a time period of the light beam 101B crossing the wedge-shaped aperture 230. The output signal of the photoelectric device 107 detecting the light beam 101B crossing the wedge-shaped aperture 230 is converted into a digital signal by utilizing an output signal by the aperture 233 as A/D converting signal, and the absolute position is detected with an accuracy which is determined by a pitch of the apertures 233. In the second embodiment, a signal which serves the same function as the signal 108A in the first embodiment as shown in FIG. 4(b) is obtained by mean of the apertures 231. Therefore, the photoelectric device 108 in the first embodiment is deleted. The above-mentioned method is also applicable to the first embodiment.

The moiré fringes which are formed by the apertures 228 and 229 are detected by the photoelectric sensor 107, and in a similar manner of the first embodiment, an infinitesimal distance is detected. Then the infinitesimal distance is added to the absolute position, and the compensation process is accomplished on the basis of the Table 1 as shown in the first embodiment.

Figure 10:
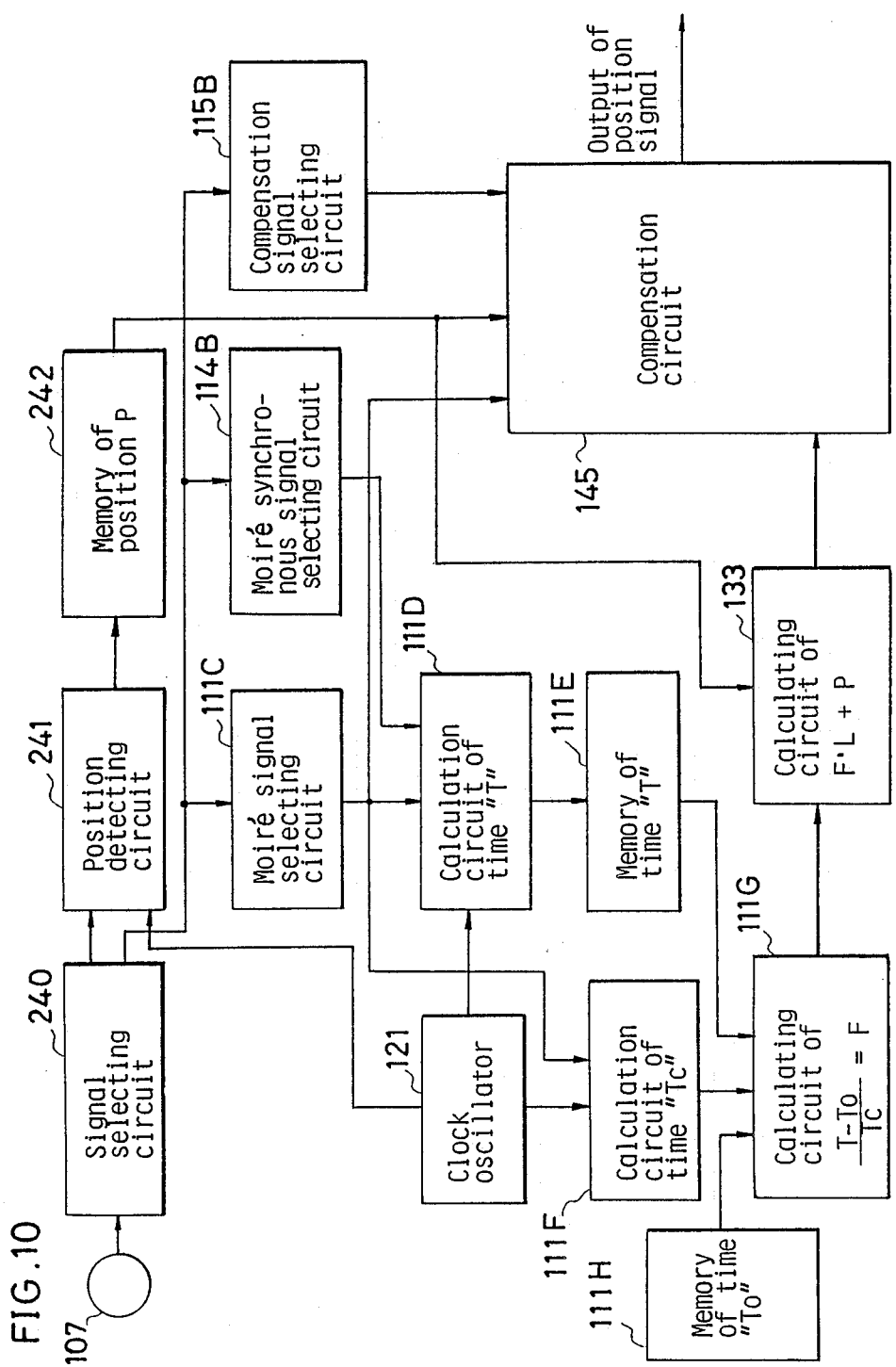
FIG. 10 is a block diagram of circuit for detecting a position in the second embodiment.
Figure 11:
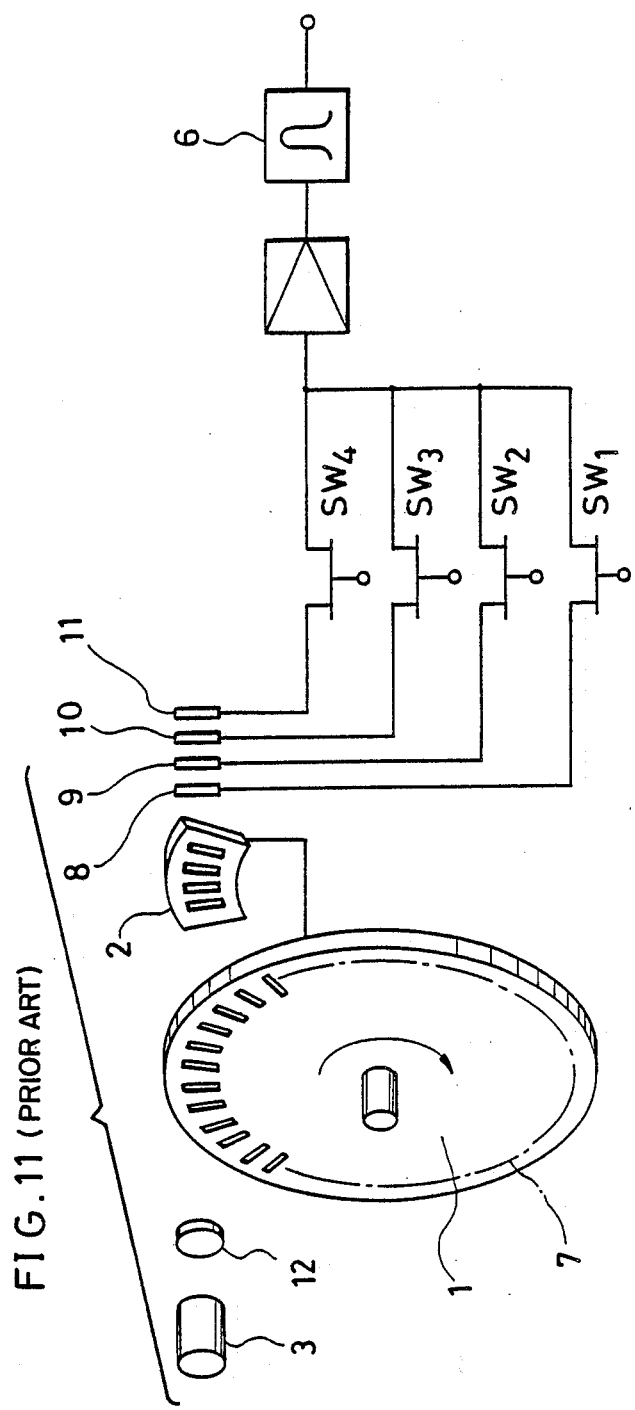
FIG. 11 is the perspective view of the position transducer in the prior art.

FIG. 10 is a block diagram of the signal processing circuit of the second embodiment. Referring to FIG. 10, a signal selecting circuit 240 discriminates signals of the wedge-shaped aperture 230 and trigger aperture 233 from the output of the photoelectric sensor 107, and the output of the signal selecting circuit 240 is inputted to a position detecting circuit 241 for detecting an absolute position. The absolute position calculated by the position detecting circuit 241 is memorized in a memory 242. Other process and circuit therefor is identical with that of the first embodiment.

Though the optical-type binary code and moiré fringes are used in the foregoing embodiments for detecting the position, another position detecting method, such as, using magnetic recording process is also applicable to the present invention. The light source and the optical system in these embodiment are not restricted by the above-described method, and a galvano-mirror is usable instead of the polygon mirror, for example.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A position transducer comprising:
    a first position detecting means for detecting an absolute position with a predetermined minimum detectable length,
    second position detecting means for detecting a position within a range of said minimum detectable length,
    first binary-value signal generating means for generating an alternating binary-value signal having a wave length of two times said minimum detectable length,
    second binary-value signal generating means for generating an alternating binary-value signal having a wave length of two times said minimum detectable length and a phase difference of 90 degrees with respect to said alternating binary-value signal of said first binary-value signal generating means, and
    compensation means for compensating said absolute position by using said position detected by said second position detecting means, and said alternating binary-value signals of said first binary-value signal generating means and said second binary-value signal generating means.

2. A position transducer in accordance with claim 1, wherein
    said first position detecting means comprises a binary code, and said alternating binary-value signals are formed by a signal of the least significant bit of said binary code.

3. A position transducer in accordance with claim 1, wherein
    said second binary-value generating means generates said alternating binary-value signal by phase-shifting the signal of the least significant bit of said binary code by substantially 90 degrees.

* * * * *